United States Patent [19]
Bellamy et al.

[11] Patent Number: 5,908,186
[45] Date of Patent: Jun. 1, 1999

[54] HYDRAULIC ANTIVIBRATION SUPPORT

[75] Inventors: Alain Bellamy, Naveil; Denis Reh, Thiville; Pierre Allaire, Chateaudun, all of France

[73] Assignee: Hutchinson, Paris, France

[21] Appl. No.: 08/991,091

[22] Filed: Dec. 15, 1997

[30] Foreign Application Priority Data

Dec. 16, 1996 [FR] France ................................ 96 15423

[51] Int. Cl.$^6$ ........................................................ F16F 5/00
[52] U.S. Cl. .......................... 248/634; 248/636; 248/638; 267/140.12
[58] Field of Search ..................................... 248/634, 636, 248/638, 562, 659; 267/140.11, 140.12, 140.13, 140.5

[56] References Cited

U.S. PATENT DOCUMENTS

| | | | |
|---|---|---|---|
| 4,383,679 | 5/1983 | Kakimoto | 248/534 X |
| 4,767,106 | 8/1988 | Le Fol | 248/636 X |
| 4,770,396 | 9/1988 | Jouade | 248/562 X |
| 4,844,430 | 7/1989 | Miya et al. | 248/636 X |
| 4,881,712 | 11/1989 | Lun | 248/636 X |
| 5,114,124 | 5/1992 | Muramatsu | 248/636 X |
| 5,556,071 | 9/1996 | Bellamy et al. | 248/634 |
| 5,741,001 | 4/1998 | Bellamy et al. | 248/634 |

FOREIGN PATENT DOCUMENTS

| | | |
|---|---|---|
| 0 382 851 | 8/1990 | European Pat. Off. . |
| 0 533 214 | 3/1993 | European Pat. Off. . |
| 0 646 735 | 4/1995 | European Pat. Off. . |
| 0 709 594 | 5/1996 | European Pat. Off. . |

OTHER PUBLICATIONS

French Search Report dated Sep. 18, 1997, French Patent Appl No. 96 15423.

*Primary Examiner*—Ramon O. Ramirez
*Assistant Examiner*—Stephen S. Wentsler
*Attorney, Agent, or Firm*—Marshall, O'Toole, Gerstein, Murray & Borun

[57] ABSTRACT

The hydraulic antivibration support has two rigid strength members interconnected by an elastomer body that has a thick bell-shaped wall, said wall defining a liquid-filled working chamber communicating with a compensation chamber via a narrow channel. The thick wall is of rectangular section and the elastomer body further includes a projection extending in the center of said wall and presenting four side faces each facing one of the sides of said thick wall. Two opposite side faces of the projection are concave in shape so that the projection has a narrow central portion between two thicker end portions.

9 Claims, 1 Drawing Sheet

HYDRAULIC ANTIVIBRATION SUPPORT

FIELD OF THE INVENTION

The present invention relates to hydraulic antivibration supports designed to be interposed between two rigid elements to damp vibration between the two elements, essentially along a main vibration axis, and to support a predetermined static load parallel to said axis.

By way of example, the two rigid elements in question can be the structure and the engine of a motor vehicle.

BACKGROUND OF THE INVENTION

Amongst antivibration supports of this type, the invention relates more particularly to those which comprise:

first and second rigid strength members suitable for securing to respective ones of the two rigid elements to be united, the second strength member extending perpendicularly to the main vibration axis:

an elastomer body interconnecting the two strength members, said elastomer body having a thick bell-shaped wall which extends and flares from a top secured to the first strength member to a base secured to the second strength member, said wall, seen in section on a plane perpendicular to the main vibration axis, having an outline which has four sides substantially in the form of a rectangle, the elastomer body further including an elastomer projection extending in the center of the thick bell-shaped wall projecting from the top of said wall towards the second strength member, said projection having four side faces each facing a respective one of the sides of the thick bell-shaped wall;

a working chamber defined both by the bell-shaped thick side wall and by a rigid wall secured to the second strength member and forming a counter-abutment for the above-mentioned projection; and a compensation chamber defined at least in part by a wall that is flexible, and in permanent communication with the working chamber via a narrow channel, the working chamber, the compensation chamber, and the narrow channel all being filled with a liquid.

Document EP-A-0 646 735 describes an example of such an antivibration support.

Supports of that type give entire satisfaction, however in certain configurations they can present relatively high dynamic stiffness for vibration at high frequency, e.g. at about 640 Hz, thus diminishing the vibration filtering effect at said frequency.

OBJECTS AND SUMMARY OF THE INVENTION

A particular object of the present invention is to mitigate that drawback.

To this end, according to the invention, in a hydraulic antivibration support of the kind in question at least two opposite side faces of the projection are concave in shape in any plane intersecting them perpendicularly to the main vibration axis, the projection thus having a narrow central portion between two thicker end portions.

In preferred embodiments of the invention, use may optionally also be made to one or more of the following dispositions:

the narrow central portion of the projection has a first thickness, while each of the end portions of the projection has a second thickness greater than the first thickness, with the difference between the first and second thicknesses being greater than 5 mm;

the area of the projection on a right section perpendicular to the main vibration axis is greater than 150 mm$^2$;

the two sides of the thick bell-shaped wall situated facing the concave side faces of the elastomer projection are longer than the other two sides of said thick bell-shaped wall;

the second strength member is constituted by a plate which extends in a plane generally perpendicular to the main vibration axis and which has a "support" face, the elastomer body being integral with the flexible wall defining the compensation chamber, and said elastomer body being fixed in leakproof manner to the support face of the second strength member, co-operating therewith to define the working chamber, the compensation chamber, and the narrow channel;

the second strength member includes a projection which projects into the working chamber towards the projection of the elastomer body;

the projection of the elastomer body has a length lying substantially in the range 2.3 cm to 2.7 cm;

each side of the thick bell-shaped wall facing a concave side face of the projection of the elastomer body, is separated from end portions of said projection by a distance which, measured perpendicularly to the main vibration axis, lies substantially in the range 0.8 cm to 1 cm; and the projection of the elastomer body is of a height measured parallel to the main vibration axis which lies substantially in the range 0.8 cm to 1.2 cm.

BRIEF DESCRIPTION OF THE DRAWING

Other characteristics and advantages of the invention appear on reading the following detailed description of an embodiment thereof, given as a non-limiting example and with reference to the accompanying drawing.

In the drawing.

MORE DETAILED DESCRIPTION

In the description below, terms such as "up", "down", "top", "bottom", "vertical", and "horizontal" are given with reference to the position in which the antivibration support of the invention is used most commonly, but the invention is not limited thereto.

Figure 1:
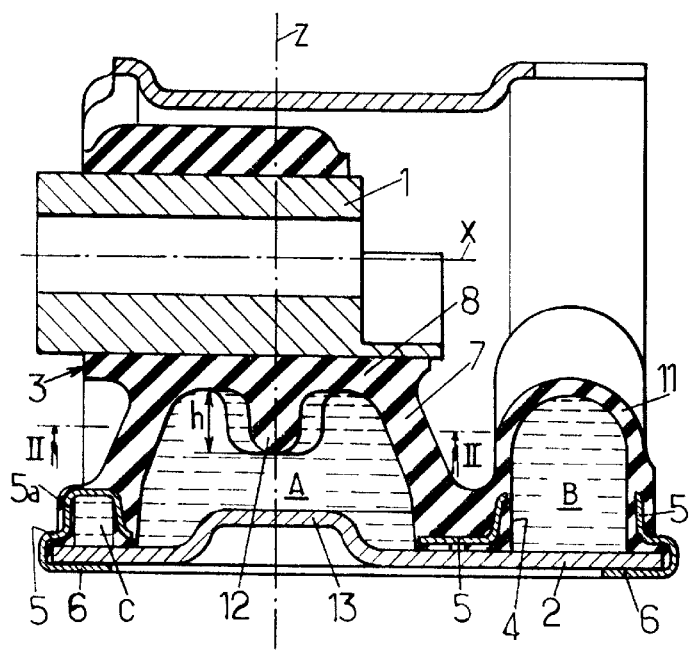
FIG. 1 is a vertical section view of a hydraulic antivibration support constituting an embodiment of the invention.
Figure 2:
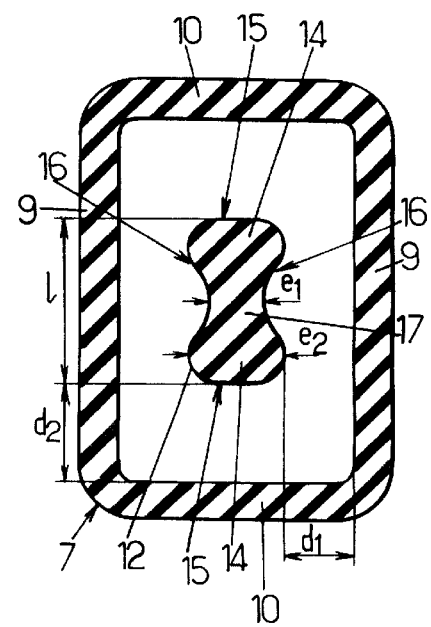
FIG. 2 is a section view on line II—II of FIG. 1.

The hydraulic antivibration support shown in FIGS. 1 and 2 comprises first and second rigid metal strength members 1 and 2 which are interconnected by an elastomer body 3 and which are designed to be interposed between two rigid elements (not shown) for connection and damping purposes.

The first strength member 1 is designed to be secured to a load that is to be supported, e.g. the drive unit of the vehicle. In the example shown in the drawings, this first strength member is in the form of an elongate tubular member extending longitudinally on a substantially horizontal axis X.

The second strength member 2 is a plate that is generally plane in shape, at least in part, and is generally intended for fixing to the structure of the vehicle, e.g. via fixing holes formed in lateral tabs (not shown) of the plate, for example as described in document EP-A-0 646 735 or in document EP-A-0 709 594.

This second strength member 2 extends perpendicularly to a vertical axis Z which constitutes both the direction in which the weight of the drive unit is applied to the first strength member, and the main direction in which vibration is to be damped.

The elastomer body 3 has a relatively wide base 4 secured in leakproof manner to the second strength member 2, in particular by means of a perforated metal plate 5 which is embedded in said base and has tabs 6 which are crimped over the edges of the second strength member 2.

As disclosed in the above-mentioned documents EP-A-0 646 735 and EP-A-0 709 594, the bottom face of the base 4 of the elastomer body is hollowed out in such a manner as to co-operate with the top face of the second strength member 2 to form:

- a liquid-filled working chamber A defined in part by a thick bell-shaped side wall 7 that converges from the base 4 towards a top 8 secured to the first strength member 1, said side wall 7 having, in section on a horizontal plane, a rectangular outline having two long sides 9 and two short sides 10 parallel to the axis X (or possibly four sides all of the same length);
- a compensation chamber B that is likewise filled with liquid, and that is defined by an easily-deformable thin wall 11 forming part of the elastomer body; and
- a narrow channel C which is itself filled with liquid and interconnects the chambers A and B, the channel being defined by a groove of shape which is preferably determined, at least in part, by a stamping 5a in the perforated plate 5.

In order to limit relative displacements between the first and second strength members 1 and 2, the elastomer body 3 includes a projection 12 which projects downwards in the working chamber A from the top 8 of the elastomer body, said projection preferably being disposed facing a raised portion 13 formed by stamping in the second strength member 2.

The height h of the projection 12 may lie in the range 0.8 cm to 1.2 cm, for example. In section on a horizontal plane, the shape of the projection 12 is elongate parallel to the long side 9 of the side wall 7 of the working chamber, and it extends longitudinally between two ends 14.

These two ends 14 have respective vertical end faces 15 which are disposed facing the short sides 10 of the side wall 7, and the projection 12 also has two other vertical faces 16 on its sides that face the long sides 9 of the side wall 7, and each of which is concave in shape, when seen in section in any horizontal plane intersecting said side faces.

Thus, the two ends 14 of the projection 12 are spaced apart from each other by a narrow central portion 17 of thickness $e_1$ parallel to the axis X which is less than its thickness $e_2$ in the vicinity of its ends 14.

The difference between the thicknesses $e_1$ and $e_2$ is preferably greater than 5 mm, with the total area of the horizontal cross-section of the projection 12 preferably remaining greater than 150 $mm^2$.

The above-described device operates as follows:

- when the two strength members 1 and 2 are subjected to oscillations of relatively large amplitude and relatively low frequency (e.g. less than 20 Hz), the oscillations cause liquid to be transferred between the chambers A and B via the narrow channel C, and these transfers of liquid tend to damp the oscillatory motion because of the liquid headlosses in the narrow channel; and
- when the two strength members 1 and 2 are subjected to relative vibratory motion of small amplitude and large frequency (e.g. greater than 20 Hz and up to about 650 Hz), the vibration in question is absorbed by the flexibility of the antivibration support, and it is not transmitted from one strength member to the other.

Figure 3:
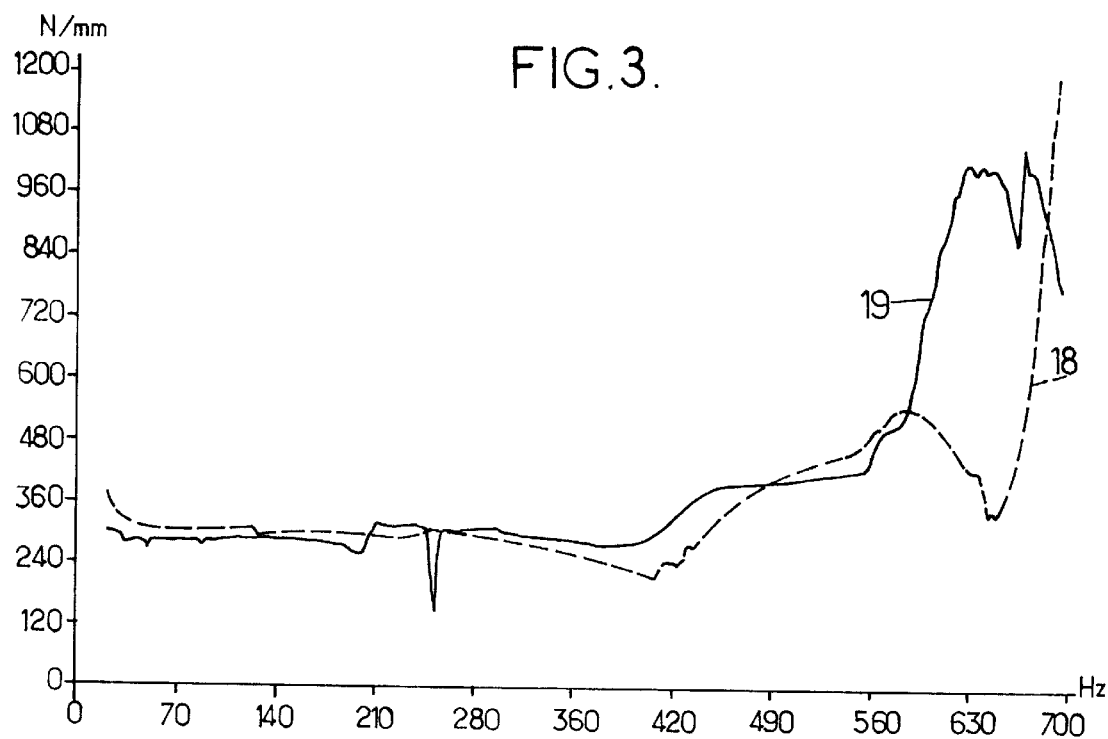
FIG. 3 is a graph showing the dynamic stiffness of the antivibration support of FIG. 1 compared with the dynamic stiffness of a similar antivibration support provided with a bottom abutment in the form of a rectangular parallelepiped.

This effective filtering of high frequency vibration is obtained because of the low dynamic stiffness of the antivibration support up to frequencies of about 650 Hz, as shown by curve 18 in FIG. 3.

By way of comparison, curve 19 shows the dynamic stiffness of a similar antivibration support in which the projection 12 does not include a narrowed central portion 17: it can be seen that the antivibration support then has a dynamic stiffness peak starting at about 600 Hz, such that the support no longer filters vibration effectively above 600 Hz, whereas the antivibration support of the invention filters vibration up to about 650 Hz.

This phenomenon is due to the fact that in the absence of the narrowed central portion 17 of the projection 12, starting at about 600 Hz, resonance phenomena occur in the two liquid columns situated respectively between the projection 12 and the two long sides 9 of the side wall 7, with each of these liquid columns extending over at least a fraction of the height of the projection 12 over the length l of said projection (e.g. about 2.3 cm to about 2.7 cm) and over the width $d_1$ left free between the projection and the side 9 of the side wall 7 (e.g. 0.8 cm to 1 cm substantially in the middle of the height of the projection 12).

In contrast, when the projection 12 has a narrowed central portion 17, the section of the two above-mentioned columns of liquid is increased such that the above-mentioned phenomenon of resonance does not occur.

Finally, it will be observed that in the present case, the distance $d_2$ between the end faces 15 of the projection 12 and the short sides 10 of the side wall 7 is greater than the distance $d_1$ substantially in the middle of the height of the projection 12 (for example $d_2$ may be 1.3 cm to 1.5 cm) such that the above-mentioned resonance phenomena do not occur in the liquid columns situated respectively between the faces 15 and the short sides 10 of the side wall 7.

Nevertheless, if the end faces 15 in question are situated closer to the short sides 10 of the side wall 7, it may be advantageous to make the end faces 15 concave in similar manner to avoid resonance phenomena similar to hose mentioned above.

We claim:

1. A hydraulic antivibration support designed to be interposed between two rigid elements to damp vibration between said two elements, the support comprising:

first and second rigid strength members suitable for securing to respective ones of the two rigid elements to be united, the second strength member extending perpendicularly to a main vibration axis of said support:

an elastomer body interconnecting the two strength members, said elastomer body having a thick bell-shaped wall which extends and flares from a top secured to the first strength member to a base secured to the second strength member, said bell-shaped wall, seen in section on a plane perpendicular to the main vibration axis, having an outline which has four sides substantially in the form of a rectangle, the elastomer body further including an elastomer projection extending in a central portion defined by the thick bell-shaped wall, the elastomer projection projecting from the top of said elastomer body towards the second strength member, seen in section on said plane perpendicular to the main vibration axis said projection having four side faces each facing a respective one of the sides of the thick bell-shaped wall;

a working chamber defined both by the bell-shaped thick side wall and by the second strength member, the second strength member comprising a rigid wall forming a counter-abutment for the elastomer projection; and a compensation chamber defined at least in part by a wall that is flexible, and said compensation chamber being in permanent communication with the working chamber via a narrow channel, the working chamber, the compensation chamber, and the narrow channel all being filled with a liquid, wherein, seen in section on said plane perpendicular to the main vibration axis, at least two opposite side faces of the projection are concave in shape, the projection thus having a narrow central portion between two thicker end portions.

2. An antivibration support according to claim 1, in which the narrow central portion of the projection has a first thickness, while each of the end portions of the projection has a second thickness greater than the first thickness, with the difference between the first and second thicknesses being greater than 5 mm.

3. An antivibration support according to claim 1, in which the area of a section of the projection seen in section on said plane perpendicular to the main vibration axis is greater than 150 mm$^2$.

4. An antivibration support according to claim 1, in which the two sides of the thick bell-shaped wall situated facing the concave side faces of the elastomer projection are longer than the other two sides of said thick bell-shaped wall.

5. An antivibration support according to claim 1, in which the second strength member is constituted by a plate which extends in a plane generally perpendicular to the main vibration axis and which has a "support" face, the elastomer body being integral with the flexible wall defining the compensation chamber, and said elastomer body being fixed in leakproof manner to the support face of the second strength member, co-operating therewith to define the working chamber, the compensation chamber, and the narrow channel.

6. An antivibration support according to claim 5, in which the second strength member includes a projection which projects into the working chamber towards the projection of the elastomer body.

7. An antivibration support according to claim 1, in which the projection of the elastomer body has a length lying substantially in the range 2.3 cm to 2.7 cm.

8. An antivibration support according to claim 7, in which each side of the thick bell-shaped wall facing a concave side face of the projection of the elastomer body, is separated from end portions of said projection by a distance which, measured perpendicularly to the main vibration axis, lies substantially in the range 0.8 cm to 1 cm.

9. An antivibration support according to claim 7, in which the projection of the elastomer body is of a height measured parallel to the main vibration axis which lies substantially in the range 0.8 cm to 1.2 cm.

* * * * *